Patented Sept. 14, 1943

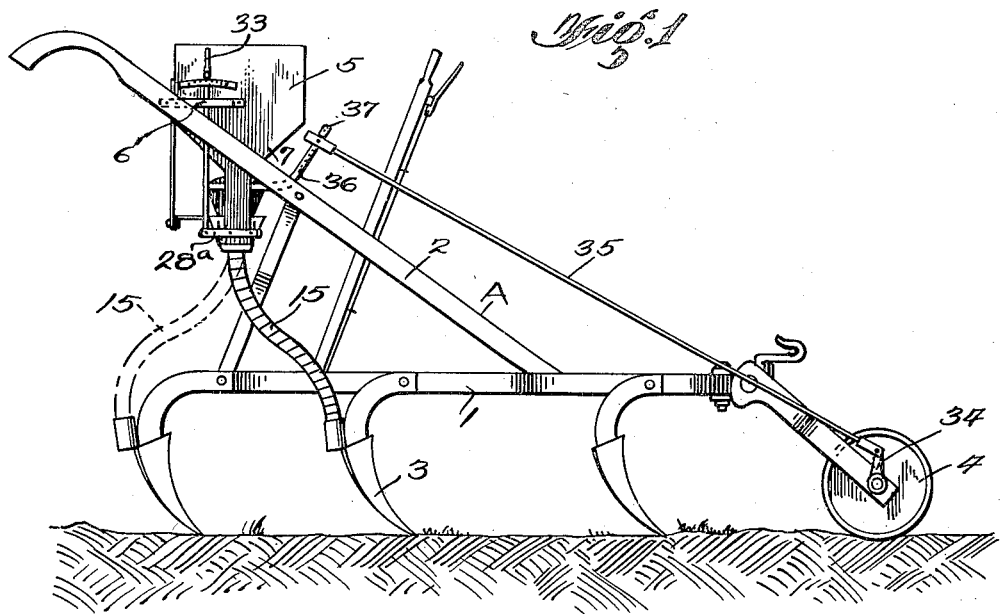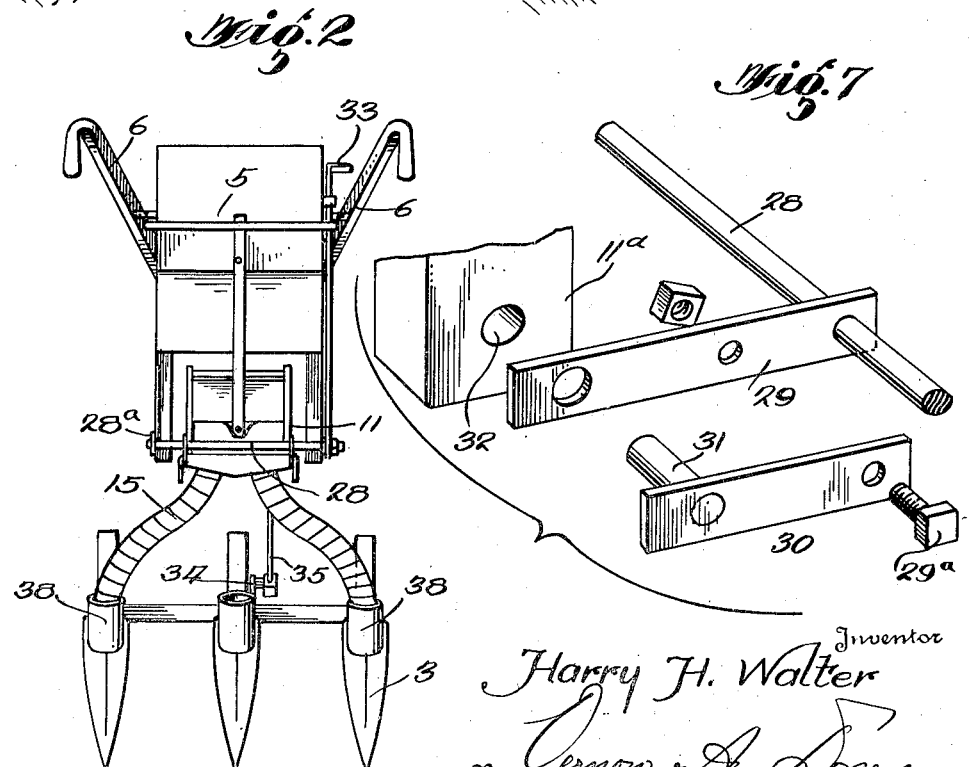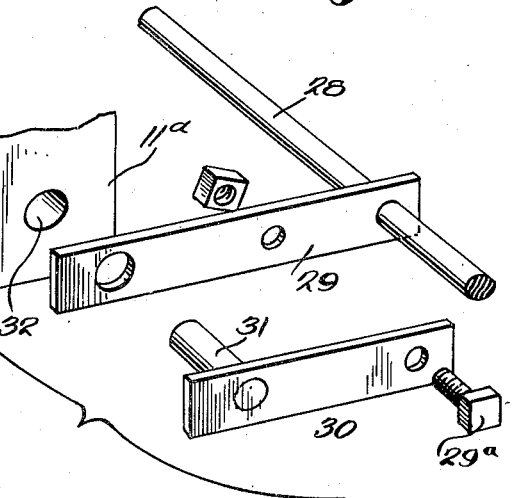

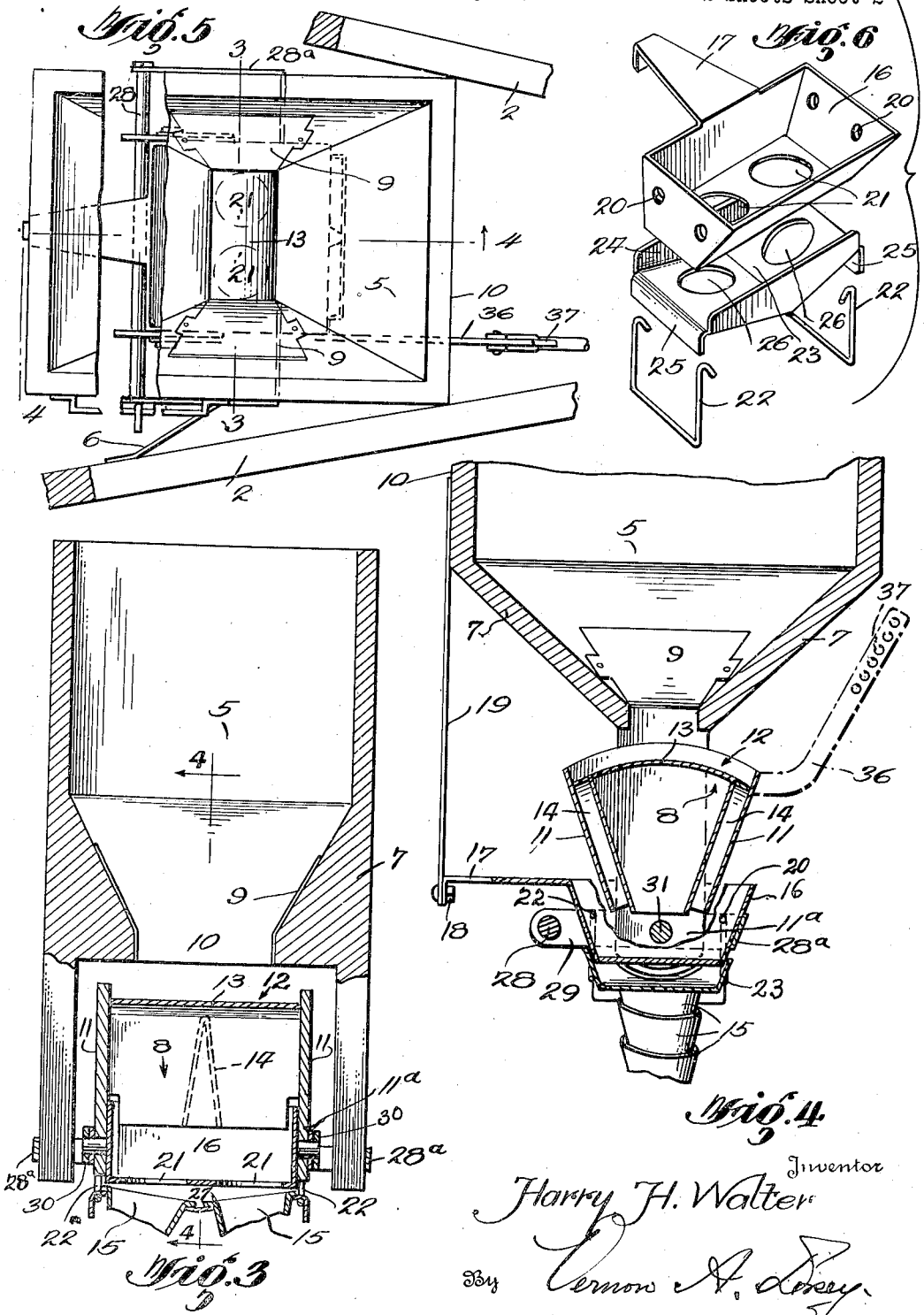

2,329,310

UNITED STATES PATENT OFFICE 2,329,310

FERTILIZER DISTRIBUTOR

Harry H. Walter, Hughesville, Md.

Application May 10, 1941, Serial No. 392,969

5 Claims. (Cl. 111—76)

This invention relates to fertilizer distributors used in connection with shoveled or hoed farm implements; i. e., cultivators or double shovel ploughs.

The invention has for its principal object to provide a conventional cultivator with fertilizer distributing means so that the fertilizer can be distributed down in the ground behind the teeth or shovels at the same time a crop is being cultivated. The fertilizer distributor can be attached to a cultivator and sold as a unit therewith, or can be furnished as a detachable unit for ready attachment to a cultivator and be removed therefrom when it is not desired to distribute fertilizer.

The invention contemplates other detail improvements in the construction of fertilizer distributors which will be more specifically referred to and brought out as the description proceeds.

Figure 1 is a side elevation of a conventional five shovel or hoe cultivator showing my improved fertilizer distributor attached thereto.

Figure 2 is a rear view of the same.

Figure 3 is a vertical section through the fertilizer distributor on the line 3—3 of Figure 5.

Figure 4 is a vertical section through the fertilizer distributor on the line 4—4 of Figures 3 and 5.

Figure 5 is a top plan view partly broken away, of the fertilizer distributor.

Figure 6 is the assembly for holding the spouts, which distribute the fertilizer to the shoes.

Figure 7 is the assembly for readily removing the distributor plate of the fertilizer distributing device from below the fertilizer hopper.

Corresponding and like parts are referred to in the following description and indicated in all the views of the drawings by the same reference characters.

Referring to Figure 1 of the drawings, A designates a conventional 5 tooth or shovel, animal-drawn cultivator and comprises the iron frame 1, the wooden handles 2, the teeth or shovels 3, and the power and depth wheel 4. Mounted between and attached to the handles 2 of the cultivator is the fertilizer hopper 5, attached to the handles by the brackets 6. The fertilizer hopper 5 is shown here as a wooden receptacle having a bottom 7 contracted so that the fertilizer in the hopper is deposited over the measuring and distributing member 8 mounted thereunder. The inside of the contracted bottom 7 of the hopper is protected by a thin metal plate 9 so that fertilizer passing through the opening 10 in the bottom of the hopper will not wear away the wooden side walls 7 of the hopper.

The side walls of the hopper 5 extend down below the opening 10 in the bottom thereof and form a support for the fertilizer distributing mechanism. The fertilizer measuring and distributing member designated as 8 comprises an outer frame 11 having mounted therein away from the front and rear walls thereof, a metal form 12, so as to form two passages for fertilizer which is displaced from the surface 13 by oncoming fertilizer and the oscillating of the distributor, as will be presently described. This metal form 12 has a plate element having a convex upper surface 13 which is materially larger than the opening 10 in the bottom of the fertilizer hopper under which the measuring and distributing member oscillates. The front and back walls of the form 12 are each formed so as to form inverted V-shaped surfaces 14 which surfaces act as guides to direct the fertilizer directly to the two spouts 15.

Below and around the lower outer walls 11 of the distributor 8 is the assembly for holding the spouts 15 to distribute the fertilizer delivered thereto. (See Figures 4 and 6.) The spout holding device comprises an elongated metal box-like member 16 having an arm 17 therefrom, which is attached by a bolt 18 to the metal strip 19 that extends down the back of the fertilizer hopper 5. In the side walls of the metal box-like member 16 are two holes 20 whose purpose will be described later. In the bottom of the box-like member 16 are two holes 21 which are large enough to accommodate the spouts 15. Attached to the box-like member 16 by the metal clips 22, the ends of which penetrate the holes 20 of the box-like member 16, is a metal supporting and holding device 23 for holding and supporting the spouts 15. This metal supporting and holding device 23 has up-turned front and back walls 24 into which fit the member 16. Both side walls 25 of the metal supporting and holding device 23 are turned down and are embraced by the wire clips 22 when the metal support and holding device 23 is assembled around the box-like structure 16. The bottom of the holding device 23 is concave so that the spouts 15 will be in the proper position to direct fertilizer to the rear shoes or hoes of the cultivator. Two holes 26 are in the bottom of the holding device 23, through which the spouts 15 enter. The spouts 15 have flanges 27 which prevent the spouts 15 from passing entirely through the openings 26 formed in the bottom of the holding device 23. The three rear shoes or hoes of the cultivator have attached to their rear, sockets 38 to accommodate and support the lower end spouts 15.

The mechanism for varying the amount or quantity of fertilizer distributed comprises a rod 28 which extends across and below the hopper 5, said rod having its ends loosely supported in the ends of the U shaped metal band 28ª that encircles three sides of the hopper construction below the opening 10 therein. The U shaped band 28ª is affixed to the lower portion of the hopper construction. Securely attached to the rod 28 by brazing or welding are two arms 29 which embrace the lower portions 11ª of the outer frame 11 of the fertilizer distributor. These two arms 29 are attached to the lower portions 11ª of the outer frame by plates 30 which have thereon pins 31 that enter the holes 32 in the lower extremity of the outer frame 11ª. (See Figure 7.) The plates 30 are held to the arms 29 by bolts 29ª, thus allowing the distributing mechanism to be readily removed from under the hopper. The pins 31 in connection with the holes 32 form bearings, allowing the distributor plate to oscillate under the fertilizer hopper.

The position of the fertilizer distributor in relation to the opening 10 of the hopper is varied by the operating lever 33, one end of which is firmly affixed to the rod 28. By moving the top of the lever 33 towards the front of the distributor, that is towards the right (Figure 1, the distributing member 8 through the linkage previously described, is moved downward in relation to the opening 10 at the bottom of the hopper thus allowing more fertilizer to pass through the opening in a given time. Through the drive wheel 4, at the front of the cultivator, the distributing member 8 is agitated or moved. This agitation or movement is caused by the crank 34 extending from the bearing of the wheel 4 and connected to the distributor 8 by the drive rod 35 or pitman and arm 36 attached to the front of the distributing member 8. For varying the adjustment of the stroke or movement of the distributing member 8, there are the holes 37 in the arm 36. By connecting the drive rod 35 or pitman in the top hole 37, a short stroke is made, thus limiting the surface 13 of the distributing member 8 which comes under or is presented under the opening 10 of the fertilizer hopper 5. Conversely by lowering the connection between the drive rod 35 or pitman and the arm 36, a long stroke will be made thus bringing practically the full surface 13 of the distributing member 8 under the opening 10 of the hopper on each revolution of the drive wheel 4.

From the foregoing, it will be seen that I have invented an improved fertilizer distributor of simple construction, which has means for varying the amount of fertilizer distributed by the mechanism by varying the surface of the distributing member that is presented to the opening in the fertilizer hopper and also by moving the distributing member away from beneath the hopper opening so that the amount of fertilizer that passes through the hopper can also be regulated with precision.

This invention is particularly advantageous in distributing measured quantities of fertilizer to the roots of growing crops. The fertilizer is distributed to the roots of the growing crops by causing the same to be conducted directly back of the cultivator shoes so that, as the cultivator is moved through the ground the dirt moved by the shoes of the cultivator will fall back over and cover the fertilizer in the ground. The cultivator can be used to top dress each side of two rows as shown in Figure 2, or can be used to top dress only one side of a single row, as shown in Figure 1. This is accomplished by changing the spouts so that the same lead to the back of the two outside back shoes or hoes or to the back middle hoe and one back outside hoe of the cultivator.

What I claim is:

1. A fertilizer distributor comprising a hopper with an opening in the bottom thereof, a pivotally mounted distributing member having a convex upper surface terminating over passages or channels formed in the walls of the distributing member mounted under said hopper opening, means for moving the distributing member in relation to the hopper opening, and means for oscillating the distributing member.

2. A fertilizer distributor comprising a hopper with an opening in the bottom thereof, a distributing member pivotally mounted under the hopper opening having an upper convex surface and passages or channels formed in the walls thereof, said passages communicating with the convex upper surface of the distributing member, means for moving the distributing member in a horizontal plane in relation to the hopper opening, and means for regulating the amount or portion of the upper surface of the distributing member that passes under the hopper opening.

3. A fertilizer distributor including a hopper with an opening in the bottom thereof, a distributing member pivotally mounted on bearings supported by linkage under the hopper opening, and means for moving the distributing member together with its bearings in relation to the hopper opening.

4. A fertilizer distributor including a hopper with an opening in the bottom thereof, a distributing member mounted for movement under the hopper opening having a convex upper surface larger than said hopper opening, and means for regulating the amount or portion of the convex surface of the distributing member that passes under the hopper opening and the position of the distributing member in relation to the hopper opening.

5. A fertilizer distributor comprising a hopper with an opening in the bottom thereof, a distributing member pivotally mounted thereunder on shiftable bearings for oscillating movement, means for moving the distributing member and its bearings toward the hopper opening, and means for regulating the amount or portion of surface of the distributing member that passes under the hopper in an oscillatory manner.

HARRY H. WALTER.